(12) United States Patent
Arruda et al.

(10) Patent No.: US 12,527,848 B2
(45) Date of Patent: Jan. 20, 2026

(54) PROTEIN C ZYMOGEN AND METHODS OF USE THEREOF TO PREVENT CANCER METASTASES

(75) Inventors: Valder R. Arruda, Philadelphia, PA (US); Katherine A. High, Merion Station, PA (US); Geerte Van Sluis, Amsterdam (NL); Christoffel Arnoldus Spek, Driebergen (NL)

(73) Assignee: The Children's Hospital of Philadelphia, Philadelphia, PA (US)

( * ) Notice: Subject to any disclaimer, the term of this patent is extended or adjusted under 35 U.S.C. 154(b) by 258 days.

(21) Appl. No.: 13/595,460

(22) Filed: Aug. 27, 2012

(65) Prior Publication Data
US 2013/0078302 A1 Mar. 28, 2013

Related U.S. Application Data

(63) Continuation-in-part of application No. PCT/US2011/026404, filed on Feb. 28, 2011.

(60) Provisional application No. 61/308,520, filed on Feb. 26, 2010.

(51) Int. Cl.
*A61K 38/48* (2006.01)
*A61K 45/06* (2006.01)
*A61K 48/00* (2006.01)
*C12N 9/64* (2006.01)

(52) U.S. Cl.
CPC .......... *A61K 38/4866* (2013.01); *A61K 45/06* (2013.01); *A61K 48/005* (2013.01); *C12N 9/6464* (2013.01); *C12Y 304/21069* (2013.01)

(58) Field of Classification Search
CPC .................................................. A61K 38/00
See application file for complete search history.

(56) References Cited

U.S. PATENT DOCUMENTS

| | | | | |
|---|---|---|---|---|
| 4,992,373 A * | 2/1991 | Bang | .......................... | C12Q 1/04 435/69.6 |
| 5,196,322 A * | 3/1993 | Bang | .................... | C12N 9/6464 435/226 |
| 5,270,178 A * | 12/1993 | Gerlitz | ...................... | A61P 7/02 435/69.1 |
| 5,460,953 A * | 10/1995 | Gerlitz | ...................... | A61P 7/02 435/226 |
| 5,614,493 A * | 3/1997 | Eibl | ................... | A61K 38/4866 514/14.9 |
| 7,087,578 B2 * | 8/2006 | Fisher et al. | | |
| 7,226,999 B2 * | 6/2007 | Andersen | ............. | C12N 9/6464 424/94.64 |
| 2004/0198660 A1 | 10/2004 | Petersen et al. | | |
| 2005/0095668 A1 | 5/2005 | Andersen et al. | | |

FOREIGN PATENT DOCUMENTS

WO 2008/157593 12/2008

OTHER PUBLICATIONS

De Cicco, M., Critical Reviews in Oncology/Hematology, 50: 187-196, 2004.*
Bezuhly, M., et al. Blood, 113: 3371-3374, Feb. 2009, (prepublished Feb. 2, 2009; see bottom of p. 3371).*
Snyder, K.M., et al., Semin. Thromb. Hemost., 734-741, 2008.*
Ribeiro, F.S., et al., Oncology Reports, 21: 1599-1604, 2009.*
De Oliveira Ada et al. (Melanoma Res. Feb. 2014; 24 (1): 11-9; pp. 1-15).*
Bruley et al. (Adv. Exp. Med. Biol. 2011; 701: 91-7).*
Burgess et al. (Journal of Cell Biology 1990; 111: 2129-2138).*
Lazar et al. (Molecular and Cellular Biology 1988, 8: 1247-1252).*
Guo et al. (Proc. Natl. Acad. Sci. USA. Jun. 22, 2004; 101 (25): 9205-9210).*
Baratto et al. (Intensive Care Med. Sep. 2008; 34 (9): 1707-12).*
Kroiss et al. (Biologics. Mar. 24, 2010; 4: 51-60).*
Gil et al. (Proteomics. May 2009; 9 (9): 2555-67).*
Perillo et al. (Pediatr. Rep. Jun. 15, 2016; 8 (2): 6488; pp. 1-4).*
Malato et al. (Am. J. Hematol. Feb. 2012; 87 (2): 230-2).*
Hau et al. (Thromb. Haemost. Oct. 31, 1988; 60 (2): 267-70).*
Beaulieu et al. (Exp. Cell. Res. Feb. 15, 2007; 313 (4): 677-87).*
Dennis (Nature. Aug. 7, 2006; 442: 739-741).*
Uchiba et al. (Circ. Res. Jul. 9, 2004; 95 (1): 34-41).*
Cheng et al. (Nat. Med. Mar. 2003; 9 (3): 338-42).*
Bae et al. (Thromb. Haemost. Jul. 2008; 100 (1): 101-9).*
Takahashi et al. (Thromb. Haemost. Aug. 30, 1985; 54 (2): 445-9).*
Bezuhly et al. (Blood. Apr. 2, 2009; 113 (14): 3371-4).*
Van Sluis et al. (Thromb Res. Apr. 2010; 125 (Suppl. 2): S138-42).*
Lu et al. (J. Biol. Chem. Apr. 15, 2005; 280 (15): 15471-8).*
Gura (Science. 1997; 278: 1041-1042).*
Suzuki et al. (Semin. Thromb. Hemost. Oct. 2007; 33 (7): 667-72).*
Antón et al. (Am. J. Respir. Crit. Care Med. Jul. 1, 2012; 186 (1): 96-105).*
Mosnier et al. (J. Biol. Chem. Nov. 9, 2007; 282 (45): 33022-33).*
Andreou et al. (PLoS One. Apr. 1, 2015; 10 (4): e0122410; pp. 1-16).*
Lind et al. (Blood. Oct. 15, 1993; 82 (8): 2423-32).*
Bork et al. (J. Pharmac. Sci. 2009; 98 (1): 3499-508).*
Crudele et al. (Mol. Ther. May 2012; 20 (Suppl. 1): S266-7; Abstract #689).*
Spek et al. (Thromb. Res. Apr. 2012; 129 (Suppl. 1): S80-4).*
Mosnier et al. (Blood. Sep. 15, 2004; 104 (6): 1740-4).*
Van Sluis et al. (Blood. Aug. 27, 2009; 114 (9): 1968-73).*
Harmon et al. (JU. Biol. Chem. 2008; 283 (45): 30531-9).*
Huang et al. (Int. J. Biol. Macromol. Apr. 30, 2022; 205: 49-54).*
Strohl et al. (BioDrugs. Aug. 2015; 29 (4): 215-39).*
He et al. (Eur. J. Biochem. Jan. 15, 1995; 227 (1-2): 433-40).*

(Continued)

*Primary Examiner* — Gary B Nickol
*Assistant Examiner* — Kathleen Cunningchen
(74) *Attorney, Agent, or Firm* — Pillsbury Winthrop Shaw Pittman LLP

(57) ABSTRACT

Compositions and methods useful for the inhibition of cancer metastasis are disclosed.

23 Claims, 8 Drawing Sheets

Specification includes a Sequence Listing.

(56) References Cited

OTHER PUBLICATIONS

Bezuhly, M., et al. "Role of activated protein C and its receptor in inhibition of tumor metastasis." Blood. Apr. 2, 2009;113(14):3371-4. Epub Feb. 2, 2009.

Van Sluis, G.L., et al. "Endogenous activated protein C limits cancer cell extravasation through sphingosine-1-phosphate receptor 1-mediated vascular endothelial barrier enhancement." Blood. Aug. 27, 2009;114(9):1968-73. Epub Jul. 1, 2009.

Harmon, S., et al. "Dissociation of activated protein C functions by elimination of protein S cofactor enhancement." J Biol Chem. Nov. 7, 2008;283(45):30531-9. Epub Sep. 8, 2008.

Schuettrumpf, J., et al., "Assessing the Role of Continuous Activated Protein C (APC) Expression in Murine Thrombosis Models", Database Biosis [Online], Biosciences Information Service, Philadelphia, PA, US; Nov. 2005 (Nov. 2005); Database accession No. PREV200600183400 & Blood, 2005, 106(11)(pt. 1):301A, 47th Annual Meeting of the American Society of Hematology, Atlanta, GA, USA, Dec. 10-13, 2005, ISSN:0006-4971.

European Application No. 11748220.8, Communication pursuant to Article 94(3) EPC dated Aug. 3, 2015.

Camerer, E., et al., Platelets, protease-activated receptors, and fibrinogen in hematogenous metastasis, Blood, 2004, 104(2):397-401.

White, T.C., et al., Protein C supports platelet binding and activation under flow: role of glycoprotein Ib and apolipoprotein E receptor 2, Journal of Thrombosis and Haemostasis, 2008, 6:995-1002.

Ghanty, P., et al., Prediction of Protein Folds: Extraction of New Features, Dimensionality Reduction, and Fusion of Heterogeneous Classifiers, IEEE Transactions on Nanobioscience, vol. 8, No. 1, Mar. 10, 2019, pp. 100-110.

Shen, H-B, et al., Predicting protein fold pattern with functional domain and sequential evolution information; Journal of Theoretical Biology 256 (Oct. 3, 2008) 441-446.

\* cited by examiner

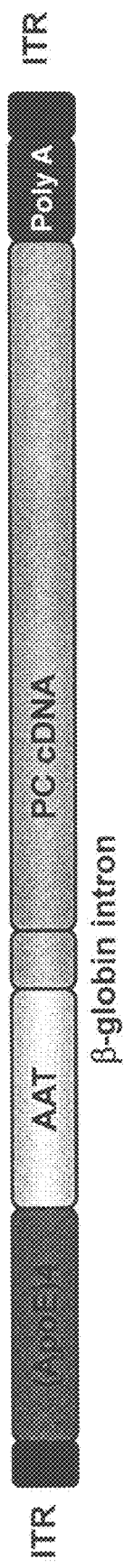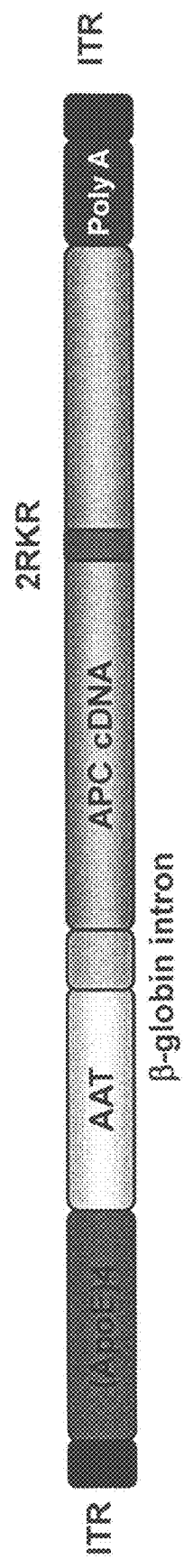
Fig 1. Schematic representation of the adeno-associated viral (AAV) vectors encoding murine forms of protein c (PC) or activated PC

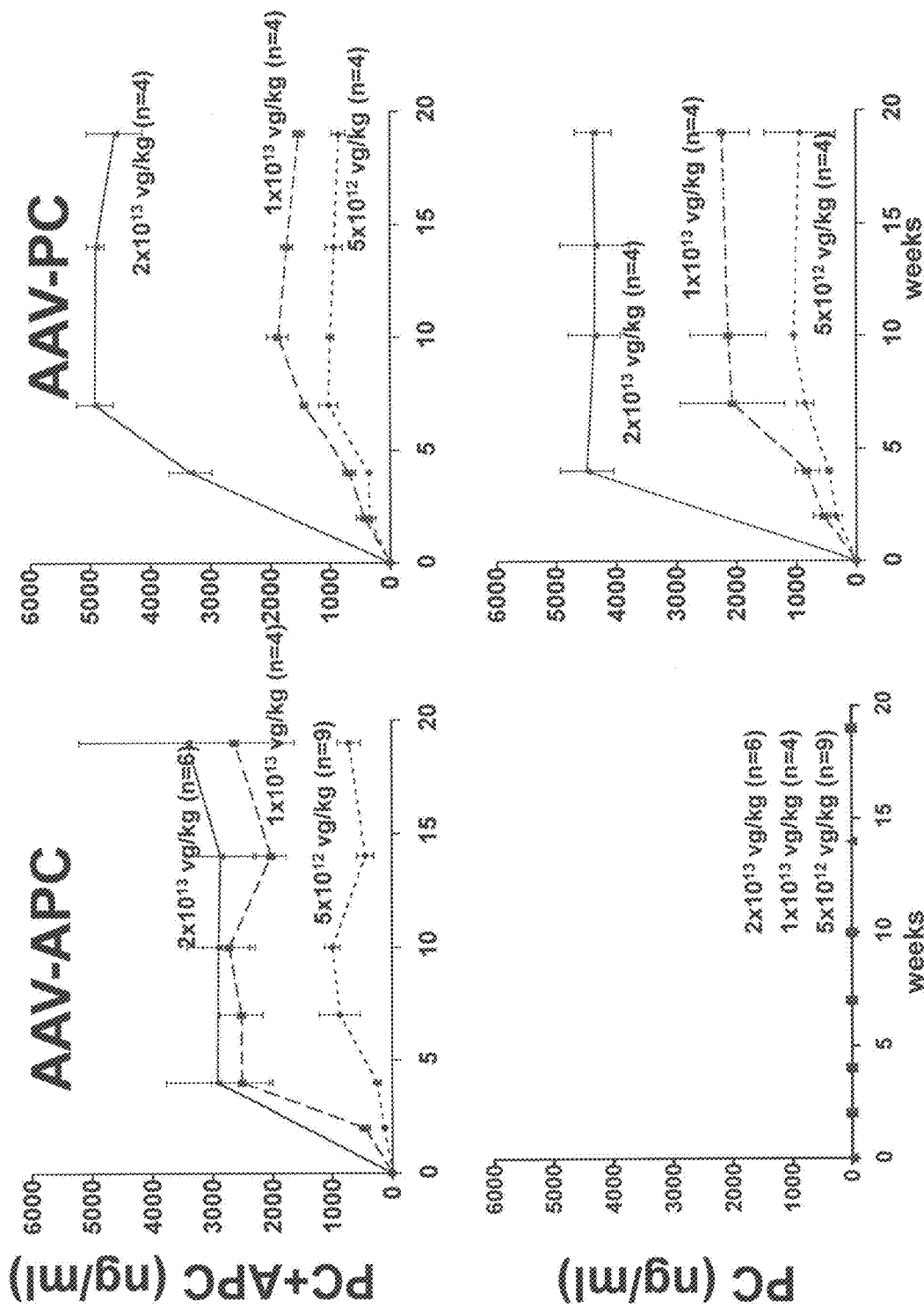
Fig 2. Time course expression of PC forms in mice injected with AAV vectors PC or APC. The vector doses are showing and numbers (n) of mice/group are shown.

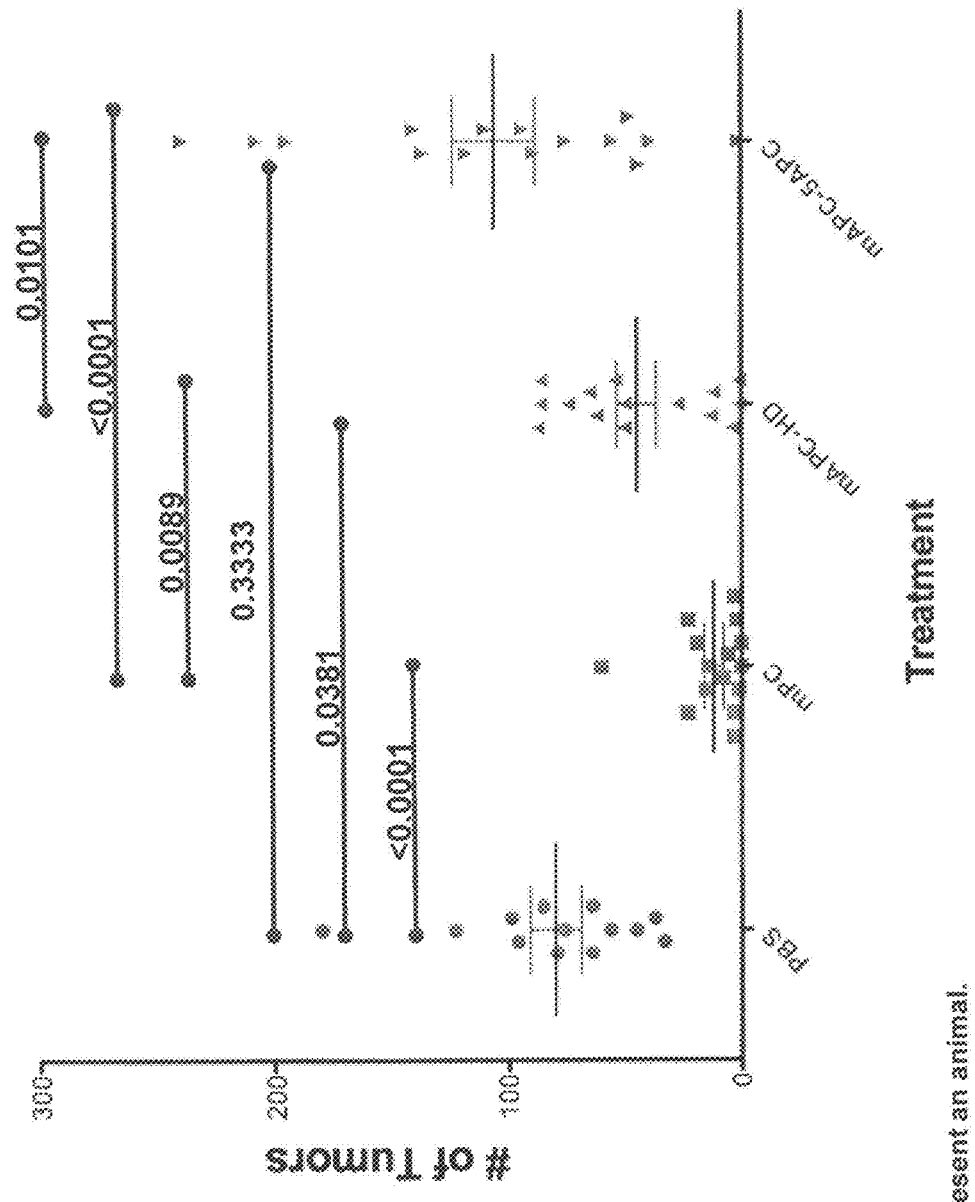
Fig 3. Numbers of lung metastasis of B16F10 melanoma cells in mice expressing murine forms of PC or APC and saline.
Each dot represent an animal.

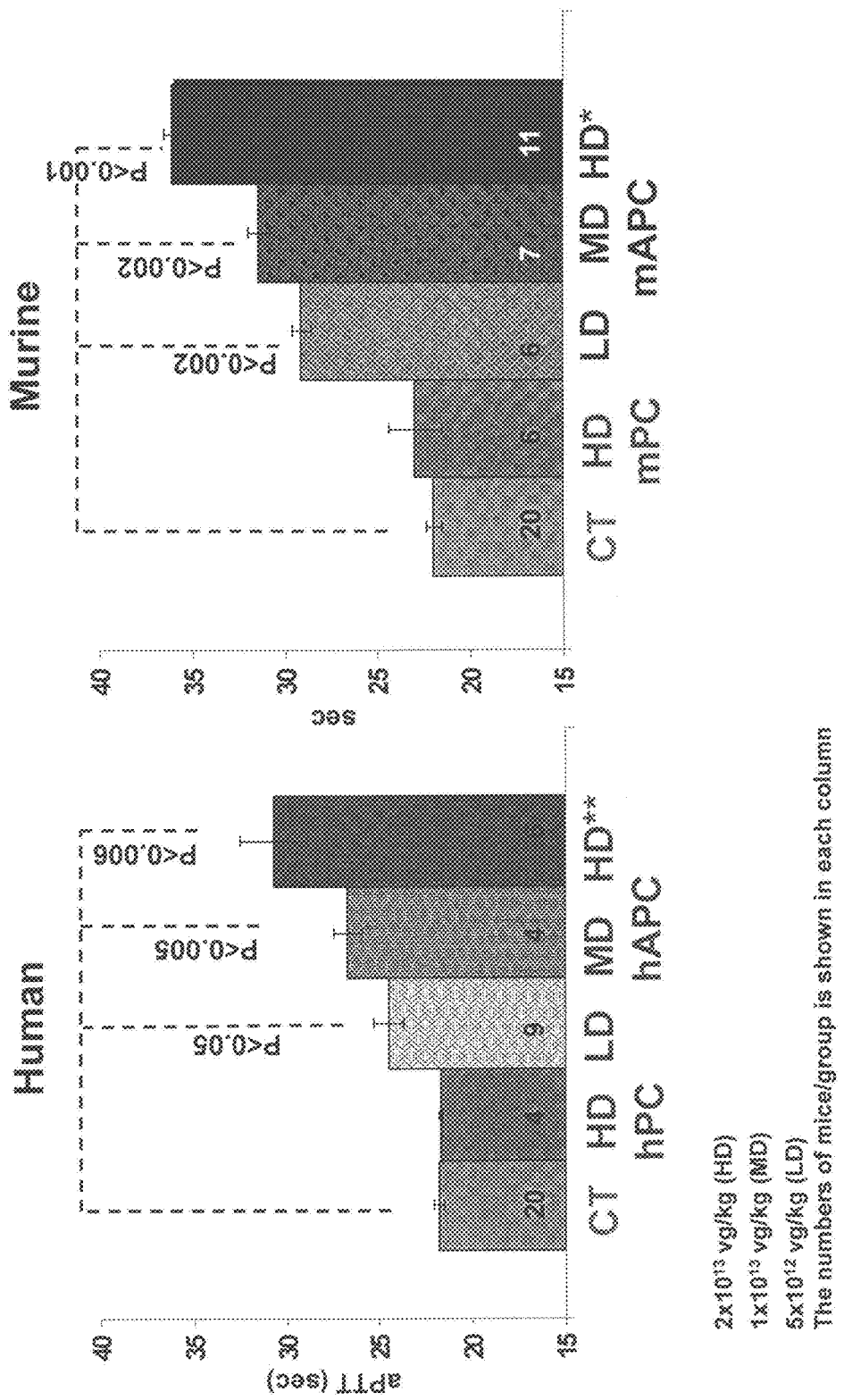
Fig 4. The anticoagulant activity of PC and APC for both human and murine protein is shown by measuring the activated thromboplastin time (aPTT). This effect is restricted only to APC in a dose dependent manner for both species.

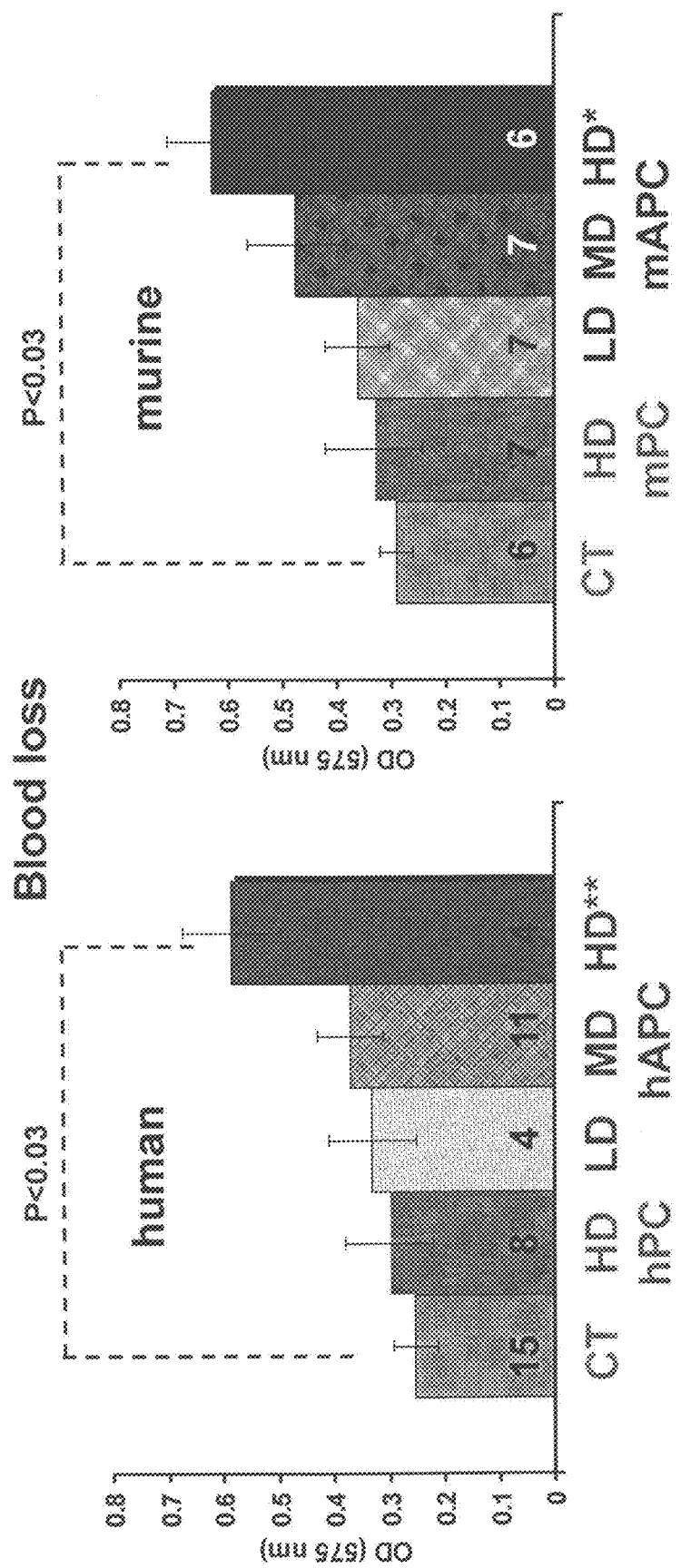
Fig 5. Blood loss (hemoglobin concentration at OD 575 nm) following tail-clipping. The increased risk of bleeding is limited to the highest functional levels of APC.

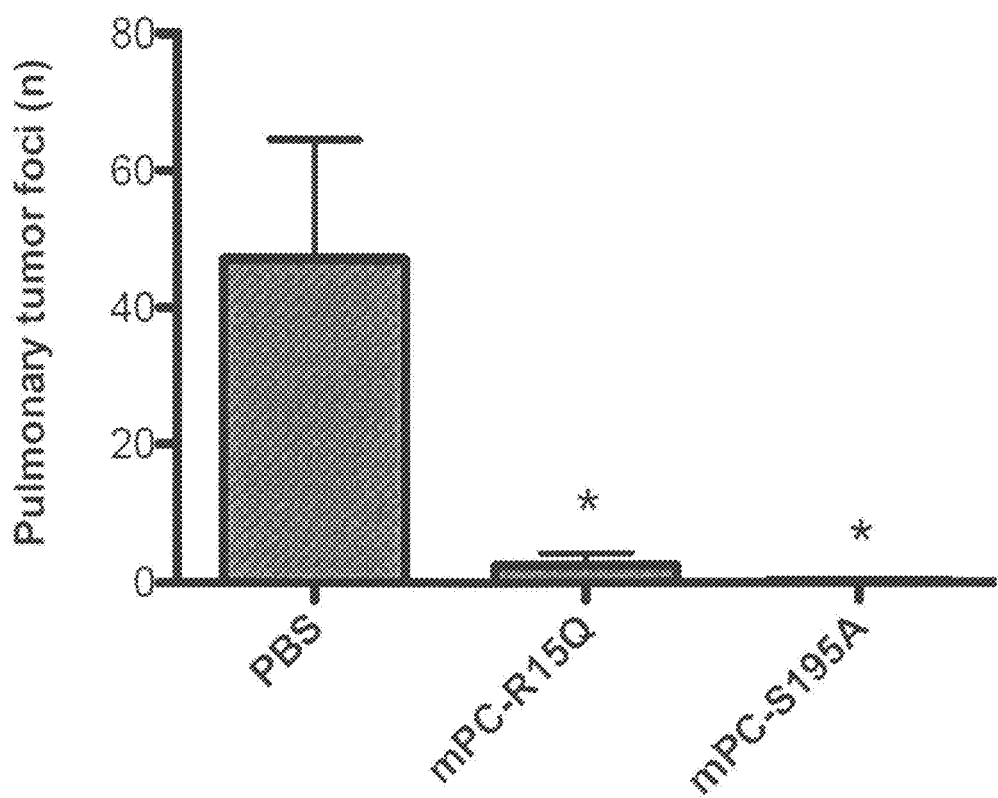

US 12,527,848 B2

SEQUENCE LISTING

```
<160> NUMBER OF SEQ ID NOS: 2

<210> SEQ ID NO 1
<211> LENGTH: 1790
<212> TYPE: DNA
<213> ORGANISM: Homo sapiens

<400> SEQUENCE: 1
atggattaac tcgaactcca ggctgtcatg gcggcaggac ggcgaacttg cagtatctcc      60
acgacccgcc cctacaggtg ccagtgcctc cagaatgtgg cagctcacaa gcctcctgct     120
gttcgtggcc acctggggaa tttccggcac accagctcct cttgactcag tgttctccag     180
cagcgagcgt gcccaccagg tgctgcggat ccgcaaacgt gccaactcct tcctggagga     240
gctccgtcac agcagcctgg agcgggagtg catagaggag atctgtgact tcgaggaggc     300
caaggaaatt ttccaaaatg tggatgacac actggccttc tggtccaagc acgtcgacgg     360
tgaccagtgc ttggtcttgc ccttggagca cccgtgcgcg agcctgtgct gcgggcacgg     420
cacgtgcatc gacggcatcg gcagcttcag ctgcgactgc cgcagcggct gggagggccg     480
cttctgccag cgcgaggtga gcttcctcaa ttgctcgctg gacaacggcg gctgcacgca     540
ttactgccta gaggaggtgg gctggcggcg ctgtagctgt gcgcctggct acaagctggg     600
```

```
ggacgacctc ctgcagtgtc accccgcagt gaagttccct tgtgggaggc cctggaagcg      660
gatggagaag aagcgcagtc acctgaaacg agacacagaa gaccaagaag accaagtaga      720
tccgcggctc attgatggga agatgaccag gcggggagac agcccctggc aggtggtcct      780
gctggactca agaagaaagc tggcctgcgg ggcagtgctc atccacccct cctgggtgct      840
gacagcggcc cactgcatgg atgagtccaa gaagctcctt gtcaggcttg agagtatga      900 cctgcggcgc tgggagaagt gggagctgga cctggacatc aaggaggtct tcgtccaccc      960
caactacagc aagagcacca ccgacaatga catcgcactg ctgcacctgg cccagcccgc     1020
caccctctcg cagaccatag tgcccatctg cctcccggac agcggccttg cagagcgcga     1080
gctcaatcag gccggccagg agaccctcgt gacgggctgg ggctaccaca gcagccgaga     1140
gaaggaggcc aagagaaacc gcaccttcgt cctcaacttc atcaagattc ccgtggtccc     1200
gcacaatgag tgcagcgagg tcatgagcaa catggtgtct gagaacatgc tgtgtgcggg     1260
catcctcggg gaccggcagg atgcctgcga gggcgacagt gggggcccca tggtcgcctc     1320
cttccacggc acctggttcc tggtgggcct ggtgagctgg ggtgagggct gtgggctcct     1380
tcacaactac ggcgtttaca ccaaagtcag ccgctacctc gactggatcc atgggcacat     1440
cagagacaag gaagcccccc agaagagctg ggcaccttag cgaccctccc tgcagggctg     1500
ggcttttgca tggcaatgga tgggacatta aagggacatg taacaagcac accgcctgc      1560 tgttctgtcc ttccatccct cttttgggct cttctggagg gaagtaacat ttactgagca     1620
cctgttgtat gtcacatgcc ttatgaatag aatcttaact cctagagcaa ctctgtgggg     1680
tggggaggag cagatccaag ttttgcgggg tctaaagctg tgtgtgttga gggggatact     1740
ctgtttatga aaagaataa aaaacacaac cacgaagcca aaaaaaaaa                  1790
```

<210> SEQ ID NO 2
<211> LENGTH: 461
<212> TYPE: PRT
<213> ORGANISM: Homo sapiens

<400> SEQUENCE: 2

```
Met Trp Gln Leu Thr Ser Leu Leu Phe Val Ala Thr Trp Gly Ile
1               5                   10                  15

Ser Gly Thr Pro Ala Pro Leu Asp Ser Val Phe Ser Ser Glu Arg
            20                  25                  30

Ala His Gln Val Leu Arg Ile Arg Lys Arg Ala Asn Ser Phe Leu Glu
        35                  40                  45

Glu Leu Arg His Ser Ser Leu Glu Arg Glu Cys Ile Glu Glu Ile Cys
    50                  55                  60

Asp Phe Glu Glu Ala Lys Glu Ile Phe Gln Asn Val Asp Asp Thr Leu
65                  70                  75                  80

Ala Phe Trp Ser Lys His Val Asp Gly Asp Gln Cys Leu Val Leu Pro
                85                  90                  95

Leu Glu His Pro Cys Ala Ser Leu Cys Cys Gly His Gly Thr Cys Ile
            100                 105                 110

Asp Gly Ile Gly Ser Phe Ser Cys Asp Cys Arg Ser Gly Trp Glu Gly
        115                 120                 125

Arg Phe Cys Gln Arg Glu Val Ser Phe Leu Asn Cys Ser Leu Asp Asn
    130                 135                 140

Gly Gly Cys Thr His Tyr Cys Leu Glu Glu Val Gly Trp Arg Arg Cys
145                 150                 155                 160
```

-continued

```
Ser Cys Ala Pro Gly Tyr Lys Leu Gly Asp Asp Leu Leu Gln Cys His
                165                 170                 175
Pro Ala Val Lys Phe Pro Cys Gly Arg Pro Trp Lys Arg Met Glu Lys
            180                 185                 190
Lys Arg Ser His Leu Lys Arg Asp Thr Glu Asp Gln Glu Asp Gln Val
        195                 200                 205
Asp Pro Arg Leu Ile Asp Gly Lys Met Thr Arg Arg Gly Asp Ser Pro
    210                 215                 220
Trp Gln Val Val Leu Leu Asp Ser Lys Lys Lys Leu Ala Cys Gly Ala
225                 230                 235                 240
Val Leu Ile His Pro Ser Trp Val Leu Thr Ala Ala His Cys Met Asp
                245                 250                 255
Glu Ser Lys Lys Leu Leu Val Arg Leu Gly Glu Tyr Asp Leu Arg Arg
            260                 265                 270
Trp Glu Lys Trp Glu Leu Asp Leu Asp Ile Lys Glu Val Phe Val His
        275                 280                 285
Pro Asn Tyr Ser Lys Ser Thr Thr Asp Asn Asp Ile Ala Leu Leu His
    290                 295                 300
Leu Ala Gln Pro Ala Thr Leu Ser Gln Thr Ile Val Pro Ile Cys Leu
305                 310                 315                 320
Pro Asp Ser Gly Leu Ala Glu Arg Glu Leu Asn Gln Ala Gly Gln Glu
                325                 330                 335
Thr Leu Val Thr Gly Trp Gly Tyr His Ser Ser Arg Glu Lys Glu Ala
            340                 345                 350
Lys Arg Asn Arg Thr Phe Val Leu Asn Phe Ile Lys Ile Pro Val Val
        355                 360                 365
Pro His Asn Glu Cys Ser Glu Val Met Ser Asn Met Val Ser Glu Asn
    370                 375                 380
Met Leu Cys Ala Gly Ile Leu Gly Asp Arg Gln Asp Ala Cys Glu Gly
385                 390                 395                 400
Asp Ser Gly Gly Pro Met Val Ala Ser Phe His Gly Thr Trp Phe Leu
                405                 410                 415
Val Gly Leu Val Ser Trp Gly Glu Gly Cys Gly Leu Leu His Asn Tyr
            420                 425                 430
Gly Val Tyr Thr Lys Val Ser Arg Tyr Leu Asp Trp Ile His Gly His
        435                 440                 445
Ile Arg Asp Lys Glu Ala Pro Gln Lys Ser Trp Ala Pro
450                 455                 460
```

PROTEIN C ZYMOGEN AND METHODS OF USE THEREOF TO PREVENT CANCER METASTASES

This application is a continuation-in-part of PCT/US2011/026404 filed Feb. 28, 2011 which in turn claims priority to U.S. provisional Application, 61/308,520 filed Feb. 26, 2010, the entire contents of each being incorporated herein by reference as though set forth in full.

SEQUENCE LISTING

The instant application contains a Sequence Listing which has been submitted electronically in ASCII format and is hereby incorporated by reference in its entirety. Said ASCII copy, created on Apr. 25, 2022, is named "CHOP0439317_ST25.txt" and 6.79 KB in size.

FIELD OF THE INVENTION

This invention relates to the fields of medicine and oncology. More specifically, the invention provides compositions and methods useful for inhibiting or preventing growth and metastasis of a variety of different types of cancer.

BACKGROUND OF THE INVENTION

Several publications and patent documents are cited throughout the specification in order to describe the state of the art to which this invention pertains. Each of these citations is incorporated herein by reference as though set forth in full.

Activated protein C (APc) is a natural anticoagulant serine protease, which serves as one of the major modulators of the coagulation system by blocking the amplification of the coagulation cascade via inactivation of factors Va and VIIIa. The APC pathway is initiated by complex formation of thrombin, thrombomodulin (TM) and the endothelial protein C receptor (EPCR) allowing the conversion of the vitamin K-dependent zymogen protein C into its activated form. The importance of APC in regulation of blood coagulation can be illustrated by the observation that a heterozygous protein C deficiency is associated with high risk of venous thrombosis, and its homozygous deficiency causes purpura fulminans, which is fatal unless treated by protein C replacement therapy.

In addition to its anticoagulant activity, APC induces direct cellular effects that regulate the inflammatory response via its direct cell signaling properties. Indeed, APC treatment significantly reduced mortality in patients with severe sepsis. Subsequent experimental animal models using APC mutants with diminished anticoagulant activity but normal cell signaling properties revealed that the protective effect of APC in systemic inflammation is dependent on its cytoprotective activity. More insight into the protective role of APC in inflammatory disease was obtained by animal studies showing that APC protects the endothelial barrier through sphingosine-1-phosphate-receptor-1 ($S_1P_1$) cross-activation. Next to inflammatory disease, we recently have shown that endogenous APC-dependent signalling also plays a key role in experimental metastasis. Indeed, endogenous APC-induced signaling protected against cancer cell extravasation in vivo through $S_1P_1$-cross-activation mediated VE-cadherin dependent mediated vascular endothelial barrier enhancement. In line, repeated administration of exogenous recombinant human APC (rhaPC) reduced the number of experimental metastasis in mice. These data suggest that APC administration may limit cancer progression and that improved protection may be provided by prolonged, continuous administration of APC. From a clinical perspective, however, the administration of APC in cancer patients may not be as straightforward as expected. Importantly, APC has a very short of approximately 15-30 minutes and therefore requires continuous infusion for optimal effects and APC is associated with severe bleeding complications. Moreover, high levels of APC lead to vascular barrier disruption in a PAR-1 dependent manner and may therefore result in aggravation of cancer progression. Thus, although APC seems a potential treatment option to limit cancer progression at a first glance, it might not be clinically applicable in the setting of cancer.

SUMMARY OF THE INVENTION

In accordance with the present invention, a method for treatment or prevention of metastasis in a cancer patient in need thereof is provided. An exemplary method entails administration of a therapeutically effective amount of a protein C zymogen in a biologically acceptable carrier, the protein C zymogen being effective to reduce the number of metastatic tumor foci in said patient. In one aspect, the protein C zymogen is infused into a patient. The protein C zymogen used in this therapeutic approach may be modified to increase the in vivo half life of the protein. Such modifications include, without limitation, genetic fusion to albumin, pegylation, siaylation and genetic fusion constant regions (Fc) or IgG1 fragments.

In an alternative embodiment, the protein C zymogen is administered to the patient in an AAV vector comprising protein C zymogen encoding nucleic acid, expression of which in the host cell results in protein C zymogen polypeptide production. In a particularly preferred embodiment, the protein C zymogen is a variant that is not activated in vivo, e.g., does not require the normal cellular signaling receptor, PAR-1. In a preferred embodiment, the variant comprises at least one amino acid substitution which is effective to alter the activity of the encoded protein relative to wild-type in order to achieve a therapeutic benefit in the patient. Protein C zymogen is effective for reducing metastasis to a variety of sites, including the lung, liver, and brain. Clearly, other types of cancers prone to metastasis may be treated with the method disclosed herein. Such cancers include, without limitation, pancreatic cancer, breast cancer, colon cancer, prostate cancer, stomach cancer, ovarian cancer, melanoma and esophageal cancer. The method may also entail administration of at least one chemotherapeutic agent.

In yet another aspect of the invention, a recombinant AAV vector comprising APC-L38D in a pharmaceutically acceptable carrier is disclosed. Nucleic acids encoding other variant protein C zymogens of the invention include a variant comprising a R169Q (inactivatable PC) substitution, a S195A (mutation in the catalytic site) substitution or a L38D substitution, one, two or all three substitutions and the proteins encoded thereby in methods of use for the treatment of cancer, particularly for the inhibition of metastasis are also disclosed. In a particularly preferred embodiment, the vector encodes the protein C zymogen variant comprising the S195A substitution and the resulting protein in used in the methods for inhibiting metastasis as disclosed herein. Alternatively, the vector encodes a variant comprising at least two of the amino acid substitutions disclosed herein, e.g., R169Q+S95A or L38D+S95A etc.).

DETAILED DESCRIPTION OF THE DRAWINGS

FIG. 1 shows a schematic representation of the adeno-associated viral (AAV) vectors encoding murine or human forms of protein c (PC) or activative protein C (APC).

FIG. 2 is a series of graphs showing expression of human PC forms in mice injected with AAV vectors PC or APC. The vector doses and numbers (n) of mice per group are shown.

FIG. 3 is a graph showing the number of lung metastases of B16F10 melanoma cells in mice expressing murine forms of PC or APC and saline.

FIG. 4 is a pair of graphs showing the anticoagulant activity of PC and APC for both human and murine protein as determined by activated thromboplastin time (aPTT). This effect is restricted only to APC in a dose dependent manner for both species.

FIG. 5 is a pair of graphs showing blood loss following tail clipping as determined by measuring hemoglobin concentration at OD 575 nm. The increased risk of bleeding is correlated with high levels of functional APC.

FIG. 8 is a graph showing that variant protein C zymogens comprising either a R169Q substitution (variant "mPC-R15Q") or S195A substitution (variant "mPC-S195A") are also effective at inhibiting lung cancer metastasis in an experimental assay.

DETAILED DESCRIPTION OF THE INVENTION

Figure 6:
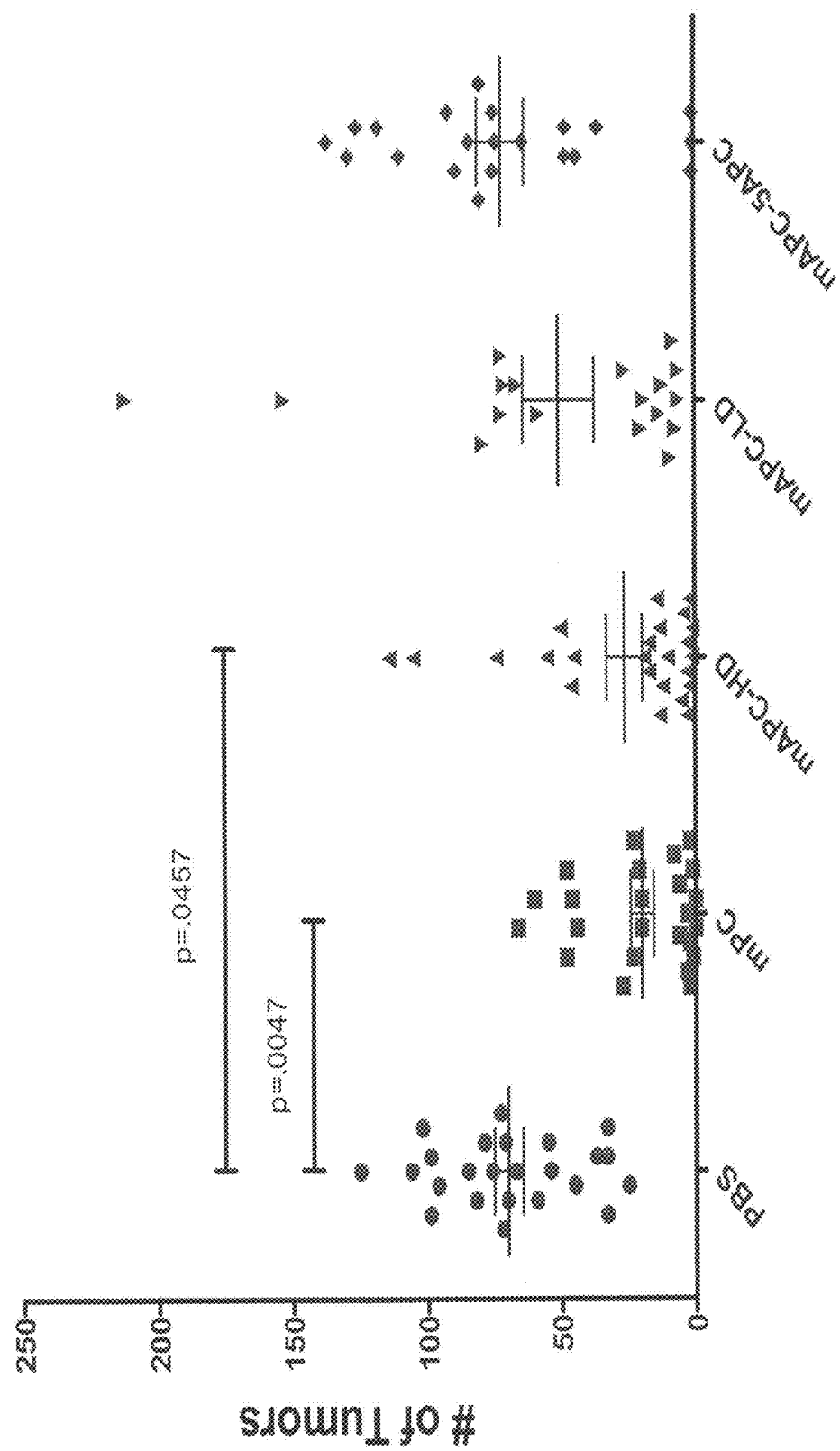
FIG. 6 is a graph showing B16F10 lung tumor counts as a function of different treatments.

Activated protein C (APC) is best known as a natural anticoagulant which also possesses cytoprotective properties. Recently, it was shown that both endogenous and exogenous APC (APC) can limit experimental metastasis. APC has however a short half-life (approximately 15 min), requires intravenous administration and is associated with severe bleeding complications. These drawbacks hinder the potential clinical application of these findings. In contrast to APC, zymogen PC has a longer half-life and is associated with significantly less bleeding complications. We hypothesized that zymogen PC may also be effective in the setting of cancer and that PC may be an attractive alternative treatment option for APC. Therefore, we compared the effect of continuous overexpression of APC and PC with adeno-associated viral vectors in a model of experimental metastasis. Interestingly, PC overexpression was highly effective in limiting experimental metastasis, whereas APC overexpression did not limit metastasis at low (<10 ng/ml) levels while at levels above (25-100 ng/ml) APC-WT is protective. However at these high doses, the risk of bleeding increases. An APC variant (APC-5A) with no anticoagulant but normal signaling properties did not limit experimental metastasis but in additional experiments, we show that APC-L38D is protective. This mutant is described in Harmon S et al., (Journal Biological Chemistry 283:30531-30539, 2008). The position of the APC-L38D mutation of Harmon S et al. corresponds to position 80 of SEQ ID NO:2: "a single amino acid substitution (L38D) ablated the ability of protein S to function as a cofactor for this [Activated Protein C] variant" (Harmon S et al., Abstract). Finally, the effect of PC overexpression appeared protease activated receptor-1 independent, suggesting that the effect is by APC's anticoagulant properties. In conclusion, zymogen PC has utility in cancer treatment for limiting cancer progression in patients in need thereof.

Definitions

The term "treat" as used herein refers to any type of treatment that imparts a benefit to a patient afflicted with a disease, including improvement in the condition of the patient, (e.g., in one or more symptoms), delay in the progression of the condition, etc.

The phrase "effective amount" refers to that amount of therapeutic agent that results in an improvement in the patient's condition.

The term "administration" as used herein refers to delivery of a therapeutic agent to a patient.

As used herein, "a pharmaceutically acceptable carrier medium" includes any and all solvents, diluents, other liquid vehicle, dispersion or suspension aids, surface active ingredients, preservatives, solid binders, lubricants, and the like, as suited to the particular dosage form desired. *Remington's Pharmaceutical Sciences*, Fifteenth Edition, E. W. Martin (Mack Publishing Co., Easton PA 1975) discloses various vehicles or carriers used in formulating pharmaceutical compositions and known techniques for the preparation thereof. Except insofar as any conventional carrier medium is incompatible with the compounds of the invention, such as by producing any undesirable biological effect or otherwise interacting in a deleterious manner with any other component(s) of the pharmaceutical composition, its use is contemplated to be within the scope of the invention.

In the pharmaceutical combination compositions of the invention, the active agents may be present in an amount of at least about 0.1% and not more than about 95% by weight, based on the total weight of the compositions, including carrier medium and auxiliary agent(s). Preferably, the proportion of active agent varies between about 1% and about 75% by weight of the composition. Pharmaceutical organic or inorganic solid or liquid carrier media suitable for enteral or parenteral administration can be used to make up the composition. Gelatine, lactose, starch, magnesium, stearate, talc, vegetable and animal fats and oils, gum, polyalkylene glycol, or other known excipients or diluents for medicaments may all be suitable as carrier media.

The compositions described herein are preferably formulated in dosage unit form for ease of administration and uniformity of dosage. "Dosage unit form" as used herein refers to a physically discrete unit of the composition for the patient to be treated. Each dosage should contain the quantity of active material calculated to produce the desired therapeutic effect either as such, or in association with the selected pharmaceutical carrier medium. The combination compositions of the invention may be administered orally, parenterally, by intramuscular injection, intraperitoneal injection, intravenous infusion, or the like. Intravenous administration is particularly preferred. The compositions of the invention are typically administered by intravenous infusions of varying duration, with infusions of 1 hour to 24 hours being preferred.

The compositions may be administered as often as necessary to obtain the desired therapeutic effect. In a preferred embodiment of the present invention, the Protein C zymogen is administered to the cancer patient as an intravenous bolus injection.

Chemotherapeutic agents are compounds that exhibit anticancer activity and/or are detrimental to a cell (e.g., a toxin). Suitable chemotherapeutic agents include, but are not limited to: toxins (e.g., saporin, ricin, abrin, ethidium bromide, diphtheria toxin, Pseudomonas exotoxin, and others listed above); alkylating agents (e.g., nitrogen mustards such as chlorambucil, cyclophosphamide, isofamide, mechlorethamine, melphalan, and uracil mustard; aziridines such as thiotepa; methanesulphonate esters such as busulfan; nitroso ureas such as carmustine, lomustine, and streptozocin; platinum complexes such as cisplatin and carboplatin, bioreductive alkylators such as mitomycin, procarbazine, dacarbazine and altretamine), DNA strand-breakage agents (e.g., bleomycin); topoisomerase II inhibitors (e.g., amsacrine, dactinomycin, daunorubicin, idarubicin, mitoxantrone, doxorubicin, etoposide, and teniposide); DNA minor groove binding agents (e.g., plicamydin); antimetabolites (e.g., folate antagonists such as methotrexate and trimetrexate; pyrimidine antagonists such as fluorouracil, fluorodeoxyuridine, CB3717, azacitidine, cytarabine, and floxuridine; purine antagonists such as mercaptopurine, 6-thioguanine, fludarabine, pentostatin; asparginase; and ribonucleotide reductase inhibitors such as hydroxyurea); tubulin interactive agents (e.g., vincristine, vinblastine, and paclitaxel (Taxol™)); hormonal agents (e.g., estrogens; conjugated estrogens; ethinyl estradiol; diethylstilbesterol; chlortrianisen; idenestrol; progestins such as hydroxyprogesterone caproate, medroxyprogesterone, and megestrol; and androgens such as testosterone, testosterone propionate, fluoxymesterone, and methyltestosterone); adrenal corticosteroids (e.g., prednisone, dexamethasone, methylprednisolone, and prednisolone); luteinizing hormone releasing agents or gonadotropin-releasing hormone antagonists (e.g., leuprolide acetate and goserelin acetate); and antihormonal antigens (e.g., tamoxifen, antiandrogen agents such as flutamide; and antiadrenal agents such as mitotane and aminoglutethimide). In a particular embodiment, the chemotherapeutic agent is selected from the group consisting of: placitaxel (Taxol™), cisplatin, docetaxol, carboplatin, vincristine, vinblastine, methotrexate, cyclophosphamide, CPT-11, 5-fluorouracil (5-FU), gemcitabine, estramustine, carmustine, adriamycin (doxorubicin), etoposide, arsenic trioxide, irinotecan, and epothilone derivatives.

With reference to nucleic acids of the invention, the term "isolated nucleic acid" is sometimes used. This term, when applied to DNA, refers to a DNA molecule that is separated from sequences with which it is immediately contiguous (in the 5' and 3' directions) in the naturally occurring genome of the organism from which it originates. For example, the "isolated nucleic acid" may comprise a DNA or cDNA molecule inserted into a vector, such as a plasmid or virus vector, or integrated into the DNA of a prokaryote or eukaryote.

With respect to RNA molecules of the invention, the term "isolated nucleic acid" primarily refers to an RNA molecule encoded by an isolated DNA molecule as defined above. Alternatively, the term may refer to an RNA molecule that has been sufficiently separated from RNA molecules with which it would be associated in its natural state (i.e., in cells or tissues), such that it exists in a "substantially pure" form (the term "substantially pure" is defined below).

With respect to protein, the term "isolated protein" or "isolated and purified protein" is sometimes used herein. This term refers primarily to a protein produced by expression of an isolated nucleic acid molecule of the invention. Alternatively, this term may refer to a protein which has been sufficiently separated from other proteins with which it would naturally be associated, so as to exist in "substantially pure" form.

The term "promoter region" refers to the transcriptional regulatory regions of a gene, which may be found at the 5' or 3' side of the coding region, or within the coding region, or within introns.

The term "vector" refers to a small carrier DNA molecule into which a DNA sequence can be inserted for introduction into a host cell where it will be replicated. An "expression vector" is a specialized vector that contains a gene or nucleic acid sequence with the necessary regulatory regions needed for expression in a host cell.

The term "operably linked" means that the regulatory sequences necessary for expression of a coding sequence are placed in the DNA molecule in the appropriate positions relative to the coding sequence so as to effect expression of the coding sequence. This same definition is sometimes applied to the arrangement of coding sequences and transcription control elements (e.g. promoters, enhancers, and termination elements) in an expression vector. This definition is also sometimes applied to the arrangement of nucleic acid sequences of a first and a second nucleic acid molecule wherein a hybrid nucleic acid molecule is generated.

Fusion proteins or chimeric proteins are proteins created through the joining of two or more genes which originally coded for separate proteins. Translation of this fusion gene results in a single polypeptide with functional properties derived from each of the original proteins. Recombinant fusion proteins are created artificially by recombinant DNA technology for use in biological research or therapeutics. Zymogen PC can be fused to a number of different types of moieties to increase the half life of the protein in vivo. Such modifications include, for example, genetic fusion to albumin, pegylation, syalation and genetic fusion to constant regions (Fc) or IgG1 fragments. Such approaches are described in Schulte (2009) Thrombosis Research 124:S6-S8; Peters et al. (2010) 115:2057-2064 and Mei et al., (2010) 116: 270-279.

The term "percent identical" is used herein with. reference to comparisons among nucleic acid or amino acid sequences. Nucleic acid and amino acid sequences are often compared using computer programs that align sequences of nucleic or amino acids thus defining the differences between the two. For purposes of this invention comparisons of nucleic acid sequences are performed using the GCG Wisconsin Package version 9.1, available from the Genetics Computer Group in Madison, Wisconsin. For convenience, the default parameters (gap creation penalty=12, gap extension penalty=4) specified by that program are intended for use herein to compare sequence identity. Alternately, the Blastn 2.0 program provided by the National Center for Biotechnology Information (found on the world wide web at ncbi.nlm.nig.gov/blast/; Altschul et al., 1990, J Mol Biel 215:403-410) using a gapped alignment with default parameters, may be used to determine the level of identity and similarity between nucleic acid sequences and amino acid sequences.

Figure 7:
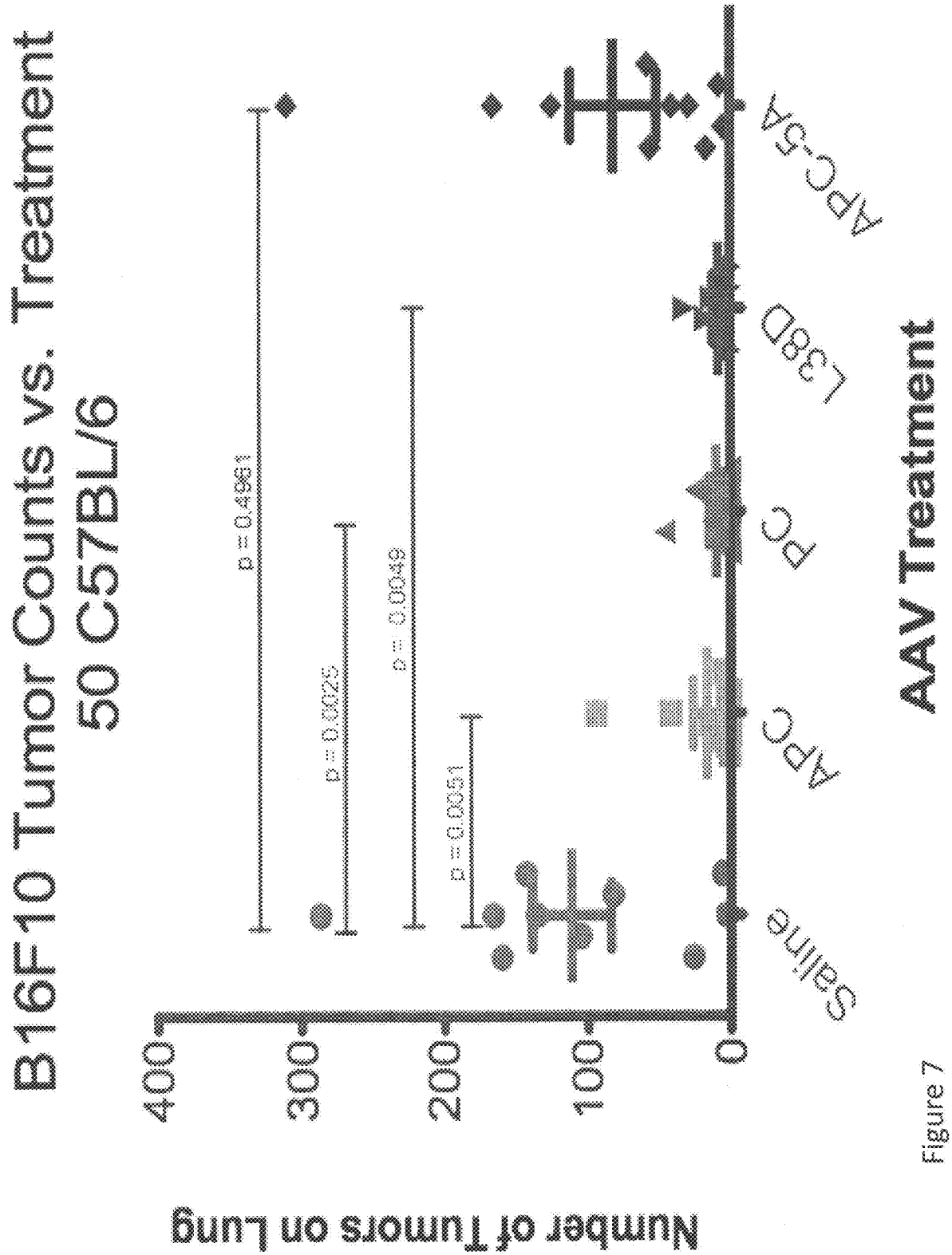
FIG. 7 is a graph showing that protein C zymogen is also effective at inhibiting lung cancer metastasis in the absence of its main cellular signaling receptor.

II. Preparation of Protein C Zymogen Encoding Nucleic Acid Molecules and Polypeptides A. Nucleic Acid Molecules Nucleic acid molecules encoding the protein C zymogen molecules of the invention may be prepared by using recombinant DNA technology methods. The availability of nucleotide sequence information enables preparation of isolated nucleic acid molecules of the invention by a variety of means. For example, nucleic acid sequences encoding a protein C zymogen polypeptide may be isolated from appropriate biological sources using standard protocols well known in the art. GENBANK™ Accession No. NM_000312 provides the nucleic acid sequence (SEQ ID NO: 1) and the amino acid sequence (SEQ ID NO: 2) of protein C zymogen. Expression and purification of such sequences is well within the purview of the skilled artisan. Variant Protein C zymogen contains a R169Q mutation (variant "PC(R15Q)"), that prevents activation of the molecule. See Lu et al., "The affinity of protein C for the thrombin-thrombomodulin complex is determined in a primary way by active site-dependent interactions" (Journal Biological Chemistry 280:15471-15478, 2005) and FIG. 7. As described by Lu et al., "The cDNA for human protein C in pUC19 was obtained as a gift from Dr. George Long, University of Vermont. Digestion with EcoRI yielded a fragment encoding the secretion signal, the propeptide, and mature human protein C. For the expression of wild type human protein C ($PC_{WT}$), this fragment was ligated into pcDNA3.1 (+) (Invitrogen) previously digested with EcoRI. An expression cassette encoding the uncleavable protein C derivative ($PC_{R15Q}$) was obtained by converting the codon for Arg at residue 169 of the mature protein to Gln. Residue 169 corresponds to residue 15 in the numbering system based on homology with chymotrypsinogen" (Lu et al., page 15472). The position of the R15Q mutation of Lu et al. (i.e., residue R169) corresponds to position 211 of SEQ ID NO: 2 of the instant application.

Nucleic acids of the present invention may be maintained as DNA in any convenient cloning vector. In a preferred embodiment, clones are maintained in a plasmid cloning/expression vector, such as pBluescript (Stratagene, La Jolla, CA), which is propagated in a suitable *E. coli* host cell. Alternatively, the nucleic acids may be maintained in vector suitable for expression in mammalian cells. In cases where post-translational modification affects coagulation function, it is preferable to express the molecule in mammalian cells.

Protein C zymogen-encoding nucleic acid molecules of the invention include cDNA, genomic DNA, RNA, and fragments thereof which may be single- or double-stranded. Thus, this invention provides oligonucleotides (sense or antisense strands of DNA or RNA) having sequences capable of hybridizing with at least one sequence of a nucleic acid molecule of the present invention. Such oligonucleotides are useful as probes for detecting Protein C zymogen expression.

B. Proteins

A protein C zymogen polypeptide of the present invention may be prepared in a variety of ways, according to known methods. The protein may be purified from appropriate sources, e.g., transformed bacterial or animal cultured cells or tissues which express engineered protein C zymogen by immunoaffinity purification.

The availability of nucleic acid molecules encoding a protein C zymogen polypeptide enables production of the same using in vitro expression methods known in the art. For example, a cDNA or gene may be cloned into an appropriate in vitro transcription vector, such as pSP64 or pSP65 for in vitro transcription, followed by cell-free translation in a suitable cell-free translation system, such as wheat germ or rabbit reticulocyte lysates. In vitro transcription and translation systems are commercially available, e.g., from Promega Biotech, Madison, Wisconsin or BRL, Rockville, Maryland.

Alternatively, according to a preferred embodiment, larger quantities of protein C zymogen may be produced by expression in a suitable prokaryotic or eukaryotic expression system. For example, part or all of a DNA molecule encoding variant protein C zymogen for example, may be inserted into a plasmid vector adapted for expression in a bacterial cell, such as *E. coli* or a mammalian cell such as CHO or Hela cells. Alternatively, in a preferred embodiment, tagged fusion proteins comprising protein C zymogen can be generated. Such protein C zymogen-tagged fusion proteins are encoded by part or all of a DNA molecule, ligated in the correct codon reading frame to a nucleotide sequence encoding a portion or all of a desired polypeptide tag which is inserted into a plasmic vector adapted for expression in a bacterial cell, such as *E. coli* or a eukaryotic cell, such as, but not limited to, yeast and mammalian cells. Vectors such as those described above comprise the regulatory elements necessary for expression of the DNA in the host cell positioned in such a manner as to permit expression of the DNA in the host cell. Such regulatory elements required for expression include, but are not limited to, promoter sequences, transcription initiation sequences, and enhancer sequences.

Protein C zymogen proteins, produced by gene expression in a recombinant prokaryotic or eukaryotic system may be purified according to methods known in the art. In a preferred embodiment, a commercially available expression/secretion system can be used, whereby the recombinant protein is expressed and thereafter secreted from the host cell, to be easily purified from the surrounding medium. If expression/secretion vectors are not used, an alternative approach involves purifying the recombinant protein by affinity separation, such as by immunological interaction with antibodies that bind specifically to the recombinant protein or nickel columns for isolation of recombinant proteins tagged with 6-8 histidine residues at their N-terminus or C-terminus. Alternative tags may comprise the FLAG epitope, GST or the hemagglutinin epitope. Such methods are commonly used by skilled practitioners.

Protein C zymogen proteins, prepared by the aforementioned methods, may be analyzed according to standard procedures. For example, such proteins may be assessed for altered coagulation properties according to known methods.

As discussed above, a convenient way of producing a polypeptide according to the present invention is to express nucleic acid encoding it, by use of the nucleic acid in an expression system. A variety of expression systems of utility for the methods of the present invention are well known to those of skill in the art.

Accordingly, the present invention also encompasses a method of making a polypeptide (as disclosed), the method including expression from nucleic acid encoding the polypeptide (generally nucleic acid). This may conveniently be achieved by culturing a host cell, containing such a vector, under appropriate conditions which cause or allow production of the polypeptide. Polypeptides may also be produced in in vitro systems.

III. Uses of Protein C Zymogens and Protein C Zymogen Encoding Nucleic Acids

Protein C zymogen polypeptides and nucleic acids encoding protein C zymogen variants having altered activities may be used according to this invention, for example, as therapeutic and/or prophylactic agents (protein or nucleic acid) for the treatment of cancer, and/or in cell-based strategies for continuous expression of protein C zymogen in cancer patients.

A. Protein C Zymogen Polypeptides

In a preferred embodiment of the present invention, protein C zymogen polypeptides may be administered to a patient via infusion in a biologically compatible carrier, preferably via intravenous injection. The protein C zymogens of the invention may optionally be fused to other stability conferring protein or chemical moieties, encapsulated into liposomes or mixed with other phospholipids or micelles to increase stability and/or bioavailability of the molecule. Protein C zymogen may be administered alone or in combination with other agents known to modulate cancer growth and progression (e.g., chemotherapeutic agents, radiation, antibodies which inhibit or block cancer cell growth, etc). An appropriate composition in which to deliver protein C zymogen polypeptides may be determined by a medical practitioner upon consideration of a variety of physiological variables, including, but not limited to, the patient's condition and stage of cancer. A variety of compositions well suited for different applications and routes of administration are well known in the art and are described hereinbelow.

The preparation containing the purified protein C zymogen contains a physiologically acceptable matrix and is preferably formulated as a pharmaceutical preparation. The preparation can be formulated using substantially known prior art methods, it can be mixed with a buffer containing salts, such as NaCl, $CaCl_2$, and amino acids, such as glycine and/or lysine, and in a pH range from 6 to 8. Until needed, the purified preparation containing the protein C zymogen can be stored in the form of a finished solution or in lyophilized or deep-frozen form. Preferably the preparation is stored in lyophilized form and is dissolved into a visually clear solution using an appropriate reconstitution solution.

Prior to processing the purified protein into a pharmaceutical preparation, the purified protein is subjected to the conventional quality controls and fashioned into a therapeutic form of presentation. In particular, during the recombinant manufacture, the purified preparation is tested for the absence of cellular nucleic acids as well as nucleic acids that are derived from the expression vector, preferably using a method, such as is described in EP 0 714 987.

B. Protein C Zymogen-Encoding Nucleic Acids

Protein C zymogen-encoding nucleic acids may be used for a variety of purposes in accordance with the present invention. In a preferred embodiment of the invention, a nucleic acid delivery vehicle (i.e. an expression vector) for modulating tumor mestastasis is provided wherein the expression vector comprises a nucleic acid sequence coding for a protein C zymogen polypeptide, or a functional fragment thereof as described herein. Administration of protein C zymogen encoding expression vectors to a patient results in the expression of protein C zymogen polypeptide which serves to inhibit metastatic growth. In accordance with the present invention, a protein c zymogen encoding nucleic acid sequence encodes a protein c zymogen polypeptide as described herein whose expression decreases metastases. In a preferred embodiment, a protein C zymogen nucleic acid sequence encodes a human protein C zymogen variant that cannot be activated.

Expression vectors comprising protein C zymogen nucleic acid sequences may be administered alone, or in combination with other molecules useful for the treatment of cancer. According to the present invention, the expression vectors or combination of therapeutic agents may be administered to the patient alone or in a pharmaceutically acceptable or biologically compatible compositions.

In a preferred embodiment of the invention, the expression vector comprising nucleic acid sequences encoding the protein C zymogen variant is a viral vector. Viral vectors which may be used in the present invention include, but are not limited to, adenoviral vectors, adeno-associated virus (AAV) vectors of multiple serotypes (e.g., AAV-1 to AAV-12, and others) and hybrid AAV vectors, lentivirus vectors and pseudo-typed lentivirus vectors [e.g., Ebola virus, vesicular stomatitis virus (VSV), and feline immunodeficiency virus (FIV)], herpes simplex virus vectors, vaccinia virus vectors, retroviral vectors, lentiviral vectors, non-viral vectors and others with or without tissue specific promoters/enhancers.

In a preferred embodiment of the present invention, methods are provided for the administration of a viral vector comprising nucleic acid sequences encoding a protein C zymogen, or a functional fragment thereof. AAV vectors and lentiviral vectors have broad utility in the methods of the present invention and preferably do not include any viral genes associated with pathogenesis. Most preferably, only the essential parts of vector e.g., the ITR and LIR elements, respectively are included. Direct delivery of vectors or ex-vivo transduction of human cells and followed by infusion into the body will result in expression of protein C zymogens thereby exerting a beneficial therapeutic effect by inhibiting tumor metastasis.

Recombinant AAV and lentiviral vectors have found broad utility for a variety of gene therapy applications. Their utility for such applications is due largely to the high efficiency of in vivo gene transfer achieved in a variety of organ contexts.

AAV and lentiviral particles may be used to advantage as vehicles for effective gene delivery. Such virions possess a number of desirable features for such applications, including tropism for dividing and non-dividing cells. Early clinical experience with these vectors also demonstrated no sustained toxicity and immune responses were minimal or undetectable. AAV are known to infect a wide variety of cell types in vivo and in vitro by receptor-mediated endocytosis or by transcytosis. These vector systems have been tested in humans targeting retinal epithelium, liver, skeletal muscle, airways, brain, joints and hematopoietic stem cells. It is likely that non-viral vectors based on plasmid DNA or minicircles will be also suitable gene transfer vectors for genes encoding protein C zymogen.

It is desirable to introduce a vector that can provide, for example, multiple copies of a desired gene and hence greater amounts of the product of that gene. Improved AAV and lentiviral vectors and methods for producing these vectors have been described in detail in a number of references, patents, and patent applications, including: Wright J. F. (Hum Gene Ther 20:698-706, 2009) which is the technology used for the production of clinical grade vector at our facility at Children's Hospital of Philadelphia. Lentiviral vector can be produced at CHOP and the other vectors are available through the Lentivirus vector production core laboratory by NHLBI Gene Therapy Resource Program (GTRP)—Lentivirus Vector Production Core Laboratory. For some applications, an expression construct may further comprise regulatory elements which serve to drive expression in a particular cell or tissue type. Such regulatory elements are known to those of skill in the art and discussed in depth in Sambrook et al. (1989) and Ausubel et al. (1992). The incorporation of tissue specific regulatory elements in the expression constructs of the present invention provides for at least partial tissue tropism for the expression of the protein C zymogens or functional fragments thereof. For example, nucleic acid sequences encoding protein C zymogen under the control of a tissue specific or cell type specific promoter can be employed for lung cell expression or the hAAT-ApoE and others for liver specific expression. Notably, liver specific expression should be suitable for the treatment of a variety of cancers from different cell types. Hematopoietic specific promoters in lentiviral vectors may also be used to advantage in the methods of the present invention.

Exemplary Methods for Producing AAV Vectors

AAV for recombinant gene expression have been produced in the human embryonic kidney cell line 293 and extensively recently reviewed by the Director of Clinical Vector Core at CHOP, Dr. J. F. Wright (Hum Gene Ther 20:698-706, 2009). Briefly, AAV vectors are engineered from wild-type AAV, a single-stranded DNA virus that is non-pathogenic. The parent virus is non-pathogenic, the vectors have a broad host range, and they can infect both dividing and non-dividing cells. The vector is engineered from the virus by deleting the rep and cap genes and replacing these with the transgene of interest under the control of a tissue or cell-specific promoter. For recombinant AAV preparation, the upper size limit of the sequence that can be inserted between the two ITRs is ~5.0 kb. The plasmids expressing FIX in this review under the control of the appropriate promoter/enhancer and a second plasmid supplying adenovirus helper functions along with a third plasmid containing the AAV-2 rep and cap genes were used to produce AAV-2 vectors, while a plasmid containing either AAV-1, AAV-6, or AAV-8 cap genes and AAV-2 rep gene and ITR's are used to produce the respective alternate serotype vectors (Gao et al., (2002) Proc. Natl Acad. Sci. USA 99:11854-11859; Xiao et al., (1999) J. Virol. 73:3994-4003; Arruda et al., (2004) Blood 103:85-92). In the present invention, the coding region for zymogen protein C or functional variants thereof would be used in place of the FIX encoding nucleic acids. AAV vectors are purified by repeated CsCl density gradient centrifugation and the titer of purified vectors determined by quantitative dot-blot hybridization. Vectors used for experiments in dogs and mice presented herein were prepared by the Vector Core at The Children's Hospital of Philadelphia, From the foregoing discussion, it can be seen that protein C zymogen polypeptides, and protein C zymogen polypeptide expressing nucleic acid vectors may be used in the treatment of cancer and the prevention of.

C. Pharmaceutical Compositions

The expression vectors of the present invention may be incorporated into pharmaceutical compositions that may be delivered to a subject, so as to allow production of a biologically active protein (e.g., a protein C zymogen polypeptide or functional fragment or derivative thereof) or by inducing continuous expression of the protein C zymogen transgene in vivo by gene- and or cell-based therapies or by ex-vivo modification of the patient's or donor's cells. In a particular embodiment of the present invention, pharmaceutical compositions comprising sufficient genetic material to enable a recipient to produce a therapeutically effective amount of a protein C zymogen polypeptide can inhibit metastatic tumor progression in the subject. Alternatively, as discussed above, an effective amount of the variant protein c zymogen polypeptide may be directly infused into a patient in need thereof. The compositions may be administered alone or in combination with at least one other agent, such as a stabilizing compound, which may be administered in any sterile, biocompatible pharmaceutical carrier, including, but not limited to, saline, buffered saline, dextrose, and water. The compositions may be administered to a patient alone, or in combination with other agents (e.g., co-factors) which influence cancer progression.

Pharmaceutical formulations suitable for parenteral administration may be formulated in aqueous solutions, preferably in physiologically compatible buffers such as Hanks' solution, Ringer's solution, or physiologically buffered saline. Aqueous injection suspensions may contain substances which increase the viscosity of the suspension, such as sodium carboxymethyl cellulose, sorbitol, or dextran. Additionally, suspensions of the active compounds may be prepared as appropriate oily injection suspensions. Suitable lipophilic solvents or vehicles include fatty oils such as sesame oil, or synthetic fatty acid esters, such as ethyl oleate or triglycerides, or liposomes. Optionally, the suspension may also contain suitable stabilizers or agents which increase the solubility of the compounds to allow for the preparation of highly concentrated solutions.

The pharmaceutical composition may be provided as a salt and can be formed with many acids, including but not limited to, hydrochloric, sulfuric, acetic, lactic, tartaric, malic, succinic, etc. Salts tend to be more soluble in aqueous or other protonic solvents than are the corresponding, free base forms. In other cases, the preferred preparation may be a lyophilized powder which may contain any or all of the following: 1-50 mM histidine, 0.1%-2% sucrose, and 2-7% mannitol, at a pH range of 4.5 to 5.5, that is combined with buffer prior to use.

After pharmaceutical compositions have been prepared, they may be placed in an appropriate container and labeled for treatment. For administration of protein c zymogen-encoding vectors or polypeptides, such labeling would include amount, frequency, and method of administration.

D. Administration

The variant protein C zymogen polypeptides, alone or in combination with other agents may be directly infused into a patient in an appropriate biological carrier as described hereinabove. Expression vectors of the present invention comprising nucleic acid sequences encoding protein C zymogen, or functional fragments thereof, may be administered to a patient by a variety of means (see below) to achieve and maintain a prophylactically and/or therapeutically effective level of the protein C zymogen polypeptide. One of skill in the art could readily determine specific protocols for using the protein C zymogen encoding expression vectors of the present invention for the therapeutic treatment of a particular patient. Protocols for the generation of adenoviral vectors and administration to patients have been described in U.S. Pat. Nos. 5,998,205; 6,228,646; 6,093,699; 6,100,242; and International Patent Application Nos. WO 94/17810 and WO 94/23744, which are incorporated herein by reference in their entirety.

Protein C zymogen encoding adenoviral vectors of the present invention may be administered to a patient by any means known. Direct delivery of the pharmaceutical compositions in vivo may generally be accomplished via injection using a conventional syringe, although other delivery methods such as convection-enhanced delivery are envisioned (See e.g., U.S. Pat. No. 5,720,720). In this regard, the compositions may be delivered subcutaneously, epidermally, intradermally, intrathecally, intraorbitally, intramucosally, intraperitoneally, intravenously, intraarterially, intrahepatically or intramuscularly. Other modes of administration include oral and pulmonary administration, suppositories, and transdermal applications. A clinician specializing in the treatment of patients with cancer may determine the optimal route for administration of the adenoviral vectors comprising protein c zymogen nucleic acid sequences based on a number of criteria, including, but not limited to: the condition of the patient and the stage of the tumor.

The present invention also encompasses AAV vectors comprising a nucleic acid sequence encoding a protein C zymogen polypeptide.

Also provided are lentivirus or pseudo-typed lentivirus vectors comprising a nucleic acid sequence encoding a protein C zymogen polypeptide.

Also encompassed are naked plasmid or expression vectors comprising a nucleic acid sequence encoding a protein C zymogen polypeptide.

The following materials and methods are provided to facilitate the practice of Example I.

Cells and Cell Culture

Murine B16F10 melanoma cells were obtained from the American Type Culture Collection (ATCC; Manassas, VA). Cells were cultured in Dulbecco Modified Eagle Medium: Nutrient Mixture F-12 (DMEM/F12; Invitrogen, Carlsbad, USA) supplemented with 10% fetal calf serum (HyClone, Logan), 1% Antibiotic-Antimycotic (Invitrogen, Carlsbad, USA) solution and L-glutamine at 37° C. Single cell suspensions were prepared from 2 mM EDTA-treated monolayers which were washed and diluted in phosphate-buffered saline (pBS) prior to counting and inoculation. Cells were stored on ice until injection.

Animals

Ten week-old, C57Bl/6 wild type mice (Charles River, Wilmington, USA) and PAR-1 deficient mice (kindly provided by Patricia Andrade-Gordon Johnson & Johnson, Langhorne, USA) were maintained at the animal care facility of the Children's hospital of Philadelphia, Pennsylvania, United States of America according to institutional guidelines. All mice were male, only the PAR-1 deficient mice were female. Animal procedures were carried out in compliance with Institutional Standards for Humane Care and Use of Laboratory Animals. The institutional Animal Care and Use Committee approved all experiments.

Adeno-Associated Viral (AAV) Vector Production and Administration

Vector preparation was by helper virus-free transient transfection of HEK-293 cells by triple transfection system; the protein C expression plasmid was a ~4.5 bp construct containing a liver-specific promoter composed of the human $\alpha_1$-antitrypsin promoter (hAAT), the ApoE enhancer, and the hepatic control region, coupled to the murine protein C cDNA following an synthetic B-globin gene intron sequence. A second plasmid supplying adenovirus helper functions, and a third plasmid containing the AAV-2 rep and AAV-8 cap AAV vectors were purified by repeated CsCl density gradient centrifugation and the titer of purified vectors was determined by quantitative dot-blot hybridization. Purification employed density centrifugation. Mice were injected before cancer cell injection via the tail vein with AAV8 vectors at doses ranging from $1 \times 10^{12}$ to $1 \times 10^{13}$ vector genome/kg. Female mice were induced with $2 \times 10^{13}$ since they respond less to vector injection. Mice were administered with either saline (5% sorbitol) or murine forms of (A)PC such as: zymogen PC (hAAT-PC), APC (by inserting a double RKR sequence for intracellular protease cleavage enzyme, PACE/furin; hAAT-APC) or APC-5A mutant (RR229/230AA and KKK191-193AAA) with minimally retained anticoagulant activity and normal cytoprotective properties (hAAT-mAPC-5A). These mutations were introduced with the QuickChange™ Site-Directed Mutagenesis Kit (Stratagene, La Jolla, CA) using mutant oligonucleotide primers constituted of 10-16 matching nucleotides on each side of the mutant codon. All cDNA fragments containing mutations were sequenced before vector construction.

Blood Sampling, Marine APC ELISA and Protein C Activity Assay

APC plasma or PC activity levels were determined by blood collection through tail bleed or vena cava puncture (at sacrifice) in 1:10 citrate or citrate supplemented with 10 nM benzamidine. Murine APC levels were determined using antibodies that were kindly provided by Dr C. T. Esmon (Howard Hughes Medical Institute, Oklahoma). Briefly, plates were coated overnight at 4° C. with monoclonal antibody AMGDPC 1587 at 5 μg/mL in coating buffer (0.02 MTris, 0.1 M NaCl, pH 7.5). Subsequently plates were blocked with blocking buffer (0.02 M Tris, 0.1 M NaCl, 1% bovine serum albumin, pH 7.5). Murine plasma samples and standard dilutions of murine APC (0.3-150 ng/ml) were loaded onto the plate and incubated at room temperature on a 300-rpm rocker for 2 h. Plates were washed with wash buffer (0.02 M Tris, 0.1 M NaCl, 0.05% Tween, pH 7.5). Spectrozyme PCa (American Diagnostica, Stamford, USA) (1 mM) diluted in coating buffer was added and incubated at 37° C. for 24 h. Absorbance was measured at 405 nm and APC levels were derived from the standard curve. Protein C activity was measured using the Actichrome PC Assay (American Diagnostica, Stamford, USA). Briefly, 50 murine plasma or standard dilutions of murine PC were incubated in the microtest plate at 37° C. for 5 minutes. Next, 75 ul Activator (PROTAC™) (or saline as negative control) was added and samples were incubated at 37° C. for 20 minutes. Spectrozyme aPC (75 ul) was added and the plate was incubated at 37° C. for 15 minutes. After the subsequent addition of 50 ul of glacial acetic acid, absorbance was measured at 405 nm and PC levels were derived from the standard curve.

Experimental Pulmonary Metastasis Model

Cancer cells ($2.5 \times 10^5$) suspended in 200 ul PBS were injected into the lateral tail vein. Twenty-one days after cancer cell injection, mice were anesthetized with isofluran and sacrificed by vena cava puncture. Lungs were fixed directly with 4% paraformaldehyde administered through the trachea and were removed afterwards. The lungs were kept in formaldehyde solution until substituted after 24 h by 70% alcohol. Tumor foci on the surface of the lungs were counted macroscopically in a blinded fashion with respect to the intervention. Experiments were performed with 8-10 mice per group.

Statistical Analysis

Statistical analysis was carried out in GraphPad Prism version 4.03. Data are expressed as means+/−SEM. Differences between groups were assessed using the Mann-Whitney test and Spearman for correlations. Statistical significance was assumed when the p-value was <0.05.

The following example is provided to illustrate certain embodiments of the invention. It is not intended to limit the invention in any way.

Example I

Administration of Protein C Zymogen Inhibits Metastatic Progression of Lung Cancer APc over-expression does not limit experimental metastasis whereas zymogen PC over-expression is highly efficient in reducing pulmonary tumor foci at equal AAV vector doses. To determine the effect of continuous (A)PC over-expression on cancer cell extravasation in a marine model of experimental metastasis, CS7B1/6 mice were injected with saline or AAV vectors for zymogen PC or APC at an equal vector dose of $1 \times 10^{13}$ vg/kg. FIG. 1 shows a schematic diagram of the constructs utilized to express activated protein c and zymogen PC. FIG. 2 shows APC levels and PC activity levels in APC and PC over-expressing mice, prior to cancer cell inoculation. AAV-PC injection induced PC activity levels by approximately 3-4 fold compared to saline-inject mice, whereas AAV-APC induced APC levels by approximately 10-fold leading to a mean plasma level of approximately 40 ng/ml. In the AAV-APC treated mice, PC activity was also moderately, but significantly, increased compared to saline injected animals.

APC possesses anticoagulant and anti-inflammatory activities. Currently, recombinant APC is the focus of extensive studies for the treatment of sepsis and certain inflammatory disorders. To date, the drug has only been FDA approved for the treatment of severe sepsis. However, as mentioned previously, the risk of bleeding significantly increases with increasing doses of APC, thus rendering the safety of this approach questionable. Since the protective effect of APC in sepsis is coagulation-independent, mutants have been created which exhibit diminished anti-coagulant activity but retain anti-inflammatory properties.

While our results demonstrate that mice expressing APC delivered via an AAV vector exhibit reduced metastatic lung cancer events, the data shown in FIG. 3 show that PC was significantly more effective for this purpose. A series of hemostatic challenges demonstrate that the risk of bleeding with ABC increases in a dose dependent fashion. See FIGS. 4 and 5. Moreover, control of tumor metastasis with APC is only achieved using high dosage levels. We also observed that the use of AAV-APC-SA showed no beneficial effect and probably is worse that the saline injected group. This data suggests that APC requires both anticoagulant and cytoprotective properties to inhibit tumor metastasis. In additional experiments, we show that APC-L38D which cannot be activated is also protective. See FIGS. 6 and 7. This mutant is described in Harmon S et al., (Journal Biological Chemistry 283:30531-30539, 2008). Also significant is the observation that the risk of bleeding in mice expressing PC did not differ from saline injected mice. See FIG. 5. FIG. 8 shows the inhibitory effects of the R169Q and S195A substitutions (respectively, in variants "mPC-R15Q" and "mPC-S195A") on the formation of tumor foci relative to untreated controls. Clearly, PC exhibits a superior efficacy and safety profile.

Many cancers (e.g., melanoma, breast, lung and pancreatic) exhibit increased morbidity and mortality due to high rates of metastasis. We compared the effects of zymogen PC and activated PC on experimental metastasis in order to discriminate between the anticoagulant and cell signaling effects of (A)PC. To this end, mice overexpressing (activated) protein C or APC signaling mutants were subjected to an established experimental metastasis model of intravenous inoculation of melanoma cancer cells. We opted for continuous over-expression of (A)PC by adeno-associated viral (AAV) vectors as this approach circumvents problems with recombinant proteins in long-term studies; i.e. short half life, multiple injections, fluctuating plasma levels and high costs.

Interestingly, the present study shows that zymogen PC over-expression limits cancer cell extravasation efficiently independent of the actual PC plasma level. In contrast, APC over-expression limits cancer cell extravasation in a dose-dependent manner and is effective only at moderately elevated levels of around 25 ng/mL. Moreover, the signaling mutant of APC (APCSA, which has no anticoagulant activity but normal cytoprotective properties) did not limit experimental metastasis at either moderate (15 ng/ml) or high (30 ng/ml) plasma levels. In line with these latter findings, the protective effect of zymogen PC seems independent of PAR-1 mediated signaling.

Clearly, protein C zymogen administration provides an effective tool used alone or in combination with other chemotherapeutic agents for treating and inhibiting the progression of metastatic malignancies.

While certain of the preferred embodiments of the present invention have been described and specifically exemplified above, it is not intended that the invention be limited to such embodiments. Various modifications may be made thereto without departing from the scope and spirit of the present invention, as set forth in the following claims.

What is claimed is:

1. A method for treatment or inhibition of metastasis in a human patient with cancer comprising administration of a therapeutically effective amount of a formulation comprising a human Protein C zymogen variant in a biologically acceptable carrier to the patient, in order to treat said cancer, wherein said cancer in said patient is selected from the group consisting of lung cancer, pancreatic cancer, breast cancer, colon cancer, melanoma and esophageal cancer, wherein said human protein C zymogen variant comprises amino acids 43-461 of SEQ ID NO:2, but for the substitution of the arginine at position 211 in SEQ ID NO:2 by glutamine.

2. The method of claim 1 wherein said formulation comprising the human protein C zymogen variant is infused into the patient.

3. The method of claim 2, wherein said human protein C zymogen variant is part of a fusion protein.

4. The method of claim 3, wherein said human protein C zymogen variant is fused to a member selected from the group consisting of albumin, an Fc fragment and an IgG1 fragment.

5. The method of claim 1, further comprising administration of at least one chemotherapeutic agent to the patient.

6. The method of claim 1 wherein said human protein C zymogen variant comprises amino acids 43-461 of SEQ ID NO:2 but for the substitution of the arginine at position 211 in SEQ ID NO:2 by glutamine and for the leucine at position 80 in SEQ ID NO: 2 by aspartic acid.

7. The method of claim 1, wherein said formulation comprising the human protein C zymogen variant is administered intravenously to the patient at least once a day at a dosage between about 10 and 500 µg/kg.

8. The method of claim 1, wherein said formulation comprising the human protein C zymogen variant is administered intravenously to the patient at least once a day at a dosage between about 10 and 250 µg/kg.

9. The method of claim 1, wherein said human protein C zymogen variant is encapsulated in a liposome or mixed with phospholipids or micelles.

10. The method of claim 1, wherein said human protein C zymogen variant is pegylated.

11. The method of claim 1, wherein said cancer in said patient is melanoma.

12. The method of claim 1, wherein said cancer in said patient is lung cancer.

13. The method of claim 1, wherein said cancer in said patient is pancreatic cancer.

14. The method of claim 1, wherein said cancer in said patient is breast cancer.

15. The method of claim 1, wherein said cancer in said patient is colon cancer.

16. The method of claim 1, wherein said cancer in said patient is esophageal cancer.

17. A method for treatment or inhibition of metastasis in a human patient with cancer comprising administration of a therapeutically effective amount of a human protein C zymogen variant in a biologically acceptable carrier to the patient, in order to treat said metastasis, wherein said human protein C zymogen variant is part of a fusion protein, and wherein the human protein C zymogen variant comprises amino acids 43-461 of SEQ ID NO:2, but for the substitution of the arginine at position 211 in SEQ ID NO:2 by glutamine.

18. The method of claim 17, wherein said human protein C zymogen variant is fused to a member selected from the group consisting of albumin, an Fc fragment and an IgG1 fragment.

19. A method for treatment or inhibition of metastasis in a human patient with cancer comprising administration of a therapeutically effective amount of a human protein C zymogen variant in a biologically acceptable carrier to the patient, in order to treat said metastasis, wherein said human protein C zymogen variant is pegylated, and wherein the human protein C zymogen variant comprises amino acids 43-461 of SEQ ID NO:2, but for the substitution of the arginine at position 211 in SEQ ID NO:2 by glutamine.

20. The method of claim 17 or 19, wherein said human protein C zymogen variant comprises amino acids 43-461 of SEQ ID NO:2 but for the substitution of the arginine at position 211 in SEQ ID NO:2 by glutamine and but for the leucine at position 80 in SEQ ID NO: 2 by aspartic acid.

21. A method for treatment or inhibition of metastasis in a human patient with cancer comprising administration of a therapeutically effective amount of a formulation comprising a human Protein C zymogen variant in a biologically acceptable carrier to the patient, in order to treat said cancer, wherein said cancer in said patient is selected from the group consisting of lung cancer, pancreatic cancer, breast cancer, colon cancer, melanoma and esophageal cancer, wherein said human protein C zymogen variant comprises amino acids 43-461 of SEQ ID NO:2 but for the substitution of the leucine at position 80 in SEQ ID NO: 2 by aspartic acid and for the substitution of the arginine at position 211 in SEQ ID NO:2 by glutamine.

22. A method for treatment or inhibition of metastasis in a patient with cancer comprising administration of a therapeutically effective amount of a human protein C zymogen variant in a biologically acceptable carrier to the patient, in order to treat said metastasis, wherein said human protein C zymogen variant is part of a fusion protein, and wherein said human protein C zymogen variant comprises amino acids 43-461 of SEQ ID NO:2 but for the substitution of the leucine at position 80 in SEQ ID NO: 2 by aspartic acid and for the substitution of the arginine at position 211 in SEQ ID NO:2 by glutamine.

23. A method for treatment or inhibition of metastasis in a patient with cancer comprising administration of a therapeutically effective amount of a human protein C zymogen variant in a biologically acceptable carrier to the patient, in order to treat said metastasis, wherein said human protein C zymogen variant is pegylated, and wherein said human protein C zymogen variant comprises amino acids 43-461 of SEQ ID NO:2 but for the substitution of the leucine at position 80 in SEQ ID NO: 2 by aspartic acid and for the substitution of the arginine at position 211 in SEQ ID NO:2 by glutamine.

* * * * *